UNITED STATES PATENT OFFICE.

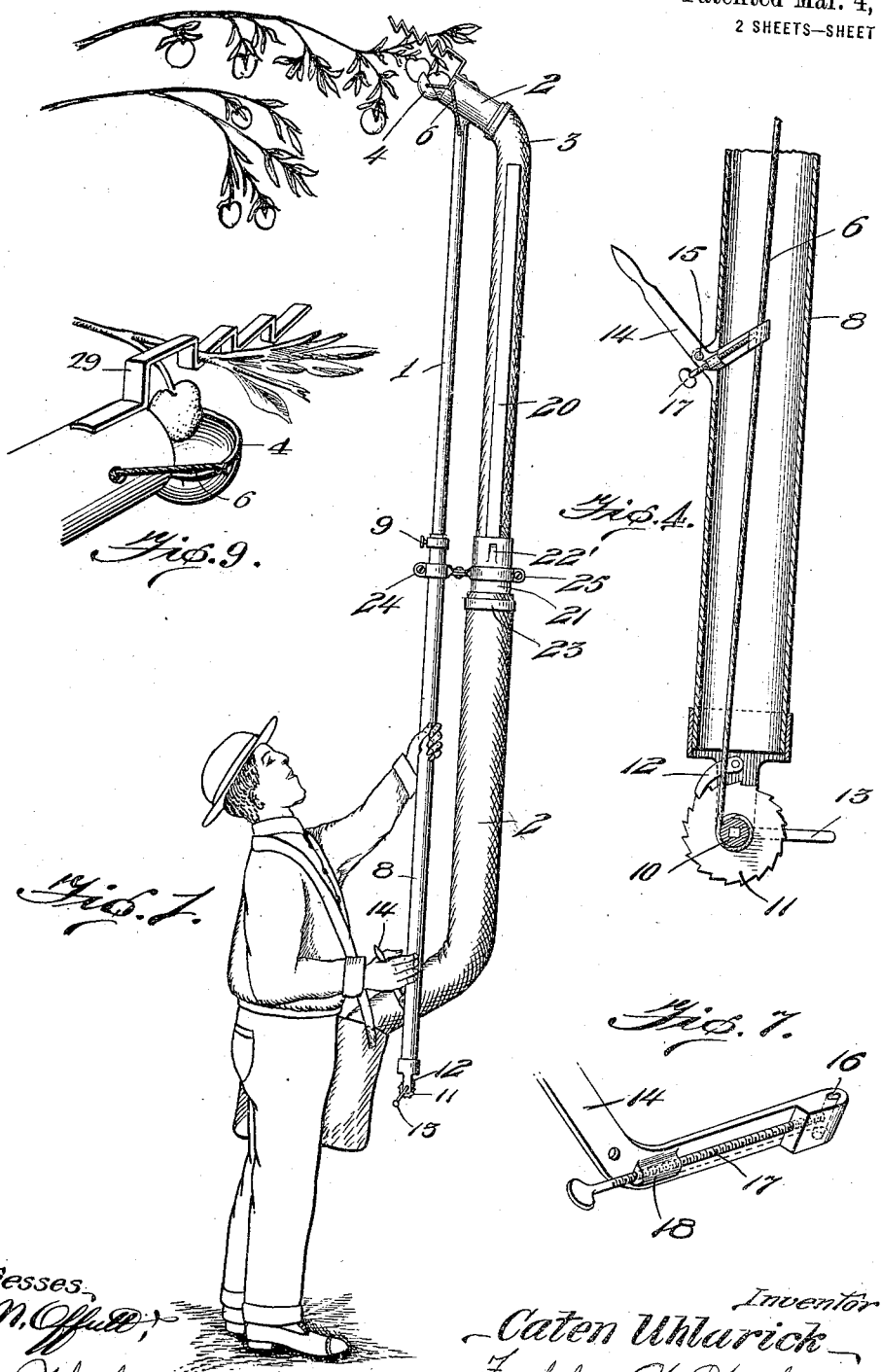

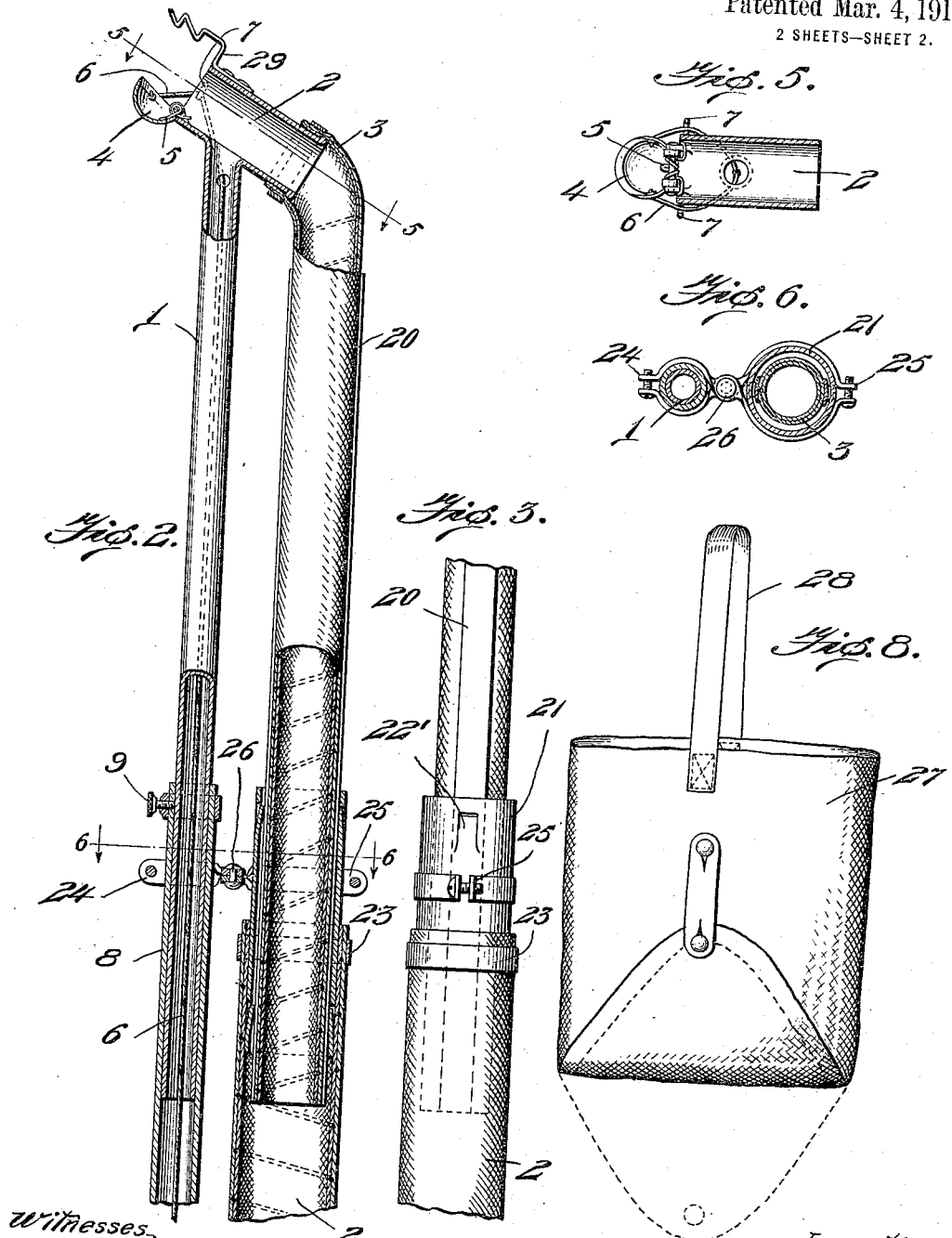

CATEN UHLARICK, OF BIG SANDY, MONTANA.

FRUIT-GATHERING DEVICE.

1,296,236.

Specification of Letters Patent. Patented Mar. 4, 1919.

Application filed June 1, 1918. Serial No. 237,753.

*To all whom it may concern:*

Be it known that I, CATEN UHLARICK, a citizen of the United States, residing at Big Sandy, in the county of Chouteau and State of Montana, have invented certain new and useful Improvements in Fruit-Gathering Devices; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fruit gathering devices, and has for its object the convenient and expeditious gathering of fruit from trees, with the person standing on the ground, thus avoiding climbing of the trees for this purpose.

A further object is to provide for conducting or delivering the fruit as it is detached from the trees on to the ground, or the receptacle into which the same is to be deposited without injury to or bruising the fruit.

A still further object is to carry out the aforesaid ends in a simple, effective and relatively inexpensive manner.

The invention consists of further details of construction combinations and arrangements of parts which will be hereinafter fully described, shown in the accompanying drawings and then specifically defined in the appended claims.

My invention is illustrated in the accompanying drawings which, with the letters of reference marked thereon, form a part of this application and in which:

Figure 1 is a side elevation of my invention as applied for use.

Fig. 2 is an elevation partly in vertical section.

Fig. 3 is an enlarged detail in elevation, showing the connecting ends of the telescoping parts of the device.

Fig. 4 is an enlarged detail vertical sectional view through the lower portion of the device.

Fig. 5 is a sectional view on line 5—5 of Fig. 2.

Fig. 6 is a sectional view on line 6—6 of Fig. 2.

Fig. 7 is a detail perspective view of means for holding the cord in a fixed position, Fig. 8 is a view in elevation of the fruit bag and Fig. 9 is a perspective view showing the application of the device to the twig of a tree.

Reference now being had to the details of the drawings by numerals:

1 designates a hollow handle having at its upper end an open ended inclined tubular portion 2, over which one end of the flexible pipe 3 fits and to which it is secured. The tubular portion 2 has hinged thereto a semi-spherical cutting member 4, and 5 is a spring fastened to the cutter and adapted to normally hold the same in an open position, as shown in Fig. 2 of the drawings. A cord 6 is fastened to the cutter and passes through an eye 7 and down through the hollow handle 1 and through the tubular shell 8 which telescopes over the handle 1, the latter and said shell 8 being held in adjusted position by means of a thumb screw 9. Said cord winds about a reel 10, shown clearly in Fig. 4 of the drawings, which is journaled at the lower end of the shell 8.

A ratchet wheel 11 rotates with the reel and is held from rotation in one direction by means of a pawl 12. A crank 13 is fixed to the ratchet wheel and forms means for rotating the same to take up the slack of the cord. An angle lever 14 is pivotally mounted upon a pin 15 and has its short arm extending within the shell 8. The inner end of the arm of the lever is apertured as at 16 to receive the cord, and 17 is a set screw mounted in a threaded boss 18 and is adapted to frictionally engage the cord to hold the same in an adjusted position in the aperture 16.

The flexible pipe 3 is reinforced by the metallic strips 20, which latter, with the pipe 3, telescope within the shell 21, having integral resilient fingers 22 struck up therefrom and which frictionally engage the strips 20 to hold the same in different adjusted positions.

A second flexible pipe 22' telescopes over the lower portion of the shell 21 and is held thereto by a band 23. The two sections 8 and 21 are held together by the clamping members 24 and 25 respectively, which are pivoted together by the pin 26. A bag 27 has a strap 28 fastened thereto and is adapted to be fitted over the lower end of the flexible pipe 2 to receive the fruit, in the manner shown in Fig. 1 of the drawings. In order to hold the apparatus over a twig, while the fruit is severed therefrom, an angle bar 29 is fastened to the upper portion 2, and the angled portions thereof are designed to catch over the twig in the manner shown in Fig. 1, while the operator by pulling upon the cord may sever the fruit, which falls down by gravity through the hollow tubular members into the bag.

It will be noted that the device is extensible and is held in different adjusted positions through the medium of the set screw shown, as well as the integral struck up fingers, and the slack in the cord is taken up by the reel and the set screw 17 grips and holds the cord to the operating handle 14, so that by the mere tilting of the lever 14, the cutter member may be operated for severing the stem of the fruit.

What I claim to be new is:

1. A fruit gathering apparatus, comprising an open-ended tubular shell, a spring pressed knife pivoted thereto, and means upon the shell for engaging and holding the twig while the fruit is being cut, a pivotal lever having an aperture therein through which said cord passes, a set screw for holding the cord in adjusted position, and a reel upon which the slack cord is adapted to wind.

2. A fruit gathering apparatus, comprising an open-ended tubular shell, a pivotal spring actuated knife mounted thereon, telescoping tubes, two of which are fastened to said shell, a lever pivoted upon one of the tubular portions having an aperture, a set screw mounted upon the lever and adapted to engage a cord passing through said aperture, a reel upon one of the tubes about which the cord winds, a ratchet rotating with the reel, and a crank fixed to the latter, a flexible pipe connected to the open-ended tubular shell, and means for holding the pipe rigid.

3. A fruit gathering apparatus, comprising an open-ended tubular shell, a pivotal spring actuated knife mounted thereon, telescoping tubes, two of which are fastened to said shell, a lever pivoted upon one of the tubular portions having an aperture, a set screw mounted upon the lever and adapted to engage a cord passing through said aperture, a reel upon one of the tubes about which the cord winds, a ratchet rotating with the reel, and a crank fixed to the latter, a flexible pipe connected to the open-ended tubular shell, metallic strips upon either side of the pipe, a coupling secured to one of said tubes and to which the flexible pipe is connected, said coupling having resilient fingers adapted to engage said metallic strips.

In testimony whereof I hereunto affix my signature in presence of two witnesses.

CATEN UHLARICK.

Witnesses:
M. O. JENKINS,
MARTIN BALAZIC.

Copies of this patent may be obtained for five cents each, by addressing the "Commissioner of Patents, Washington, D. C."